United States Patent [19]
Herzog

[11] Patent Number: 5,105,615
[45] Date of Patent: Apr. 21, 1992

[54] TURBOJET ENGINE WITH AT LEAST ONE AXIALLY MOVABLE ARRANGED SLIDING VALVE

[75] Inventor: Claus Herzog, Munich, Fed. Rep. of Germany

[73] Assignee: MTU Motoren- und Turbinen-Union Munchen GmbH, Fed. Rep. of Germany

[21] Appl. No.: 590,693

[22] Filed: Oct. 1, 1990

[30] Foreign Application Priority Data

Sep. 30, 1989 [DE] Fed. Rep. of Germany ......... 393279

[51] Int. Cl.$^5$ .............................. F02G 1/00
[52] U.S. Cl. ........................ 60/39.33; 60/225; 60/270.1; 137/15.1; 244/53 B
[58] Field of Search ............ 60/39.33, 39.79, 224, 60/225, 262, 270.1, 271; 137/15.1, 15.2; 244/53 B

[56] References Cited

U.S. PATENT DOCUMENTS

| | | | |
|---|---|---|---|
| 2,955,414 | 10/1960 | Hausmann | 60/39.33 |
| 2,970,431 | 2/1961 | Harshman | 60/39.33 |
| 2,982,093 | 5/1961 | Belcher | 60/39.33 |
| 2,986,003 | 5/1961 | Buckingham | 60/39.33 |
| 4,909,031 | 3/1990 | Grieb | 60/225 |
| 4,919,364 | 4/1990 | John | 60/270.1 |

FOREIGN PATENT DOCUMENTS 392520 10/1990 European Pat. Off. ............. 60/225

Primary Examiner—Richard A. Bertsch
Assistant Examiner—Michael I. Kocharov
Attorney, Agent, or Firm—Evenson, Wands, Edwards, Lenahan & McKeown

[57] ABSTRACT

With surface sections vaulted with respect to the valve centerline the valve mates with a stationary companion surface on an annular casing lip to optionally shut off or expose the engine by having vaulted surface sections which are arranged at an axial distance an angularly offset over the circumference by essentially 180° with the valve centerline, forming its largest relative diameter; where the vaulted surface sections form a valve of axially and circumferentially three-dimensionally displaced drop or mushroom shape.

19 Claims, 4 Drawing Sheets

TURBOJET ENGINE WITH AT LEAST ONE AXIALLY MOVABLE ARRANGED SLIDING VALVE

BACKGROUND AND SUMMARY OF THE INVENTION

This invention relates to a turbojet engine having at least one axially movably arranged sliding valve to optionally shutoff or expose the engine by means of surface sections which are vaulted with respect to the valve centerline and are mated to a stationary companion surface on an annular casing lip.

In the state of the art axially movable or adjustable, drop-shaped or mushroom-shaped sliding valves in the form of predominantly self-enclosed bodies are generally provided as shutoff or control means on gas turbine or turbojet engines. With such sliding valve designs in, e.g., drop or mushroom shape and with an axis symmetrically divergent/convergent contour in the direction of flow, a circular cylindrical shutoff face is formed at the point of maximum valve diameter. This construction results in comparatively large valve diameters that are out of reasonable proportions compared with the engine or component diameters being achieved today which despite high engine performance and mission envelopes, give or should give comparatively low frontal area drag. A shutoff valve of said type to be arranged at, e.g., the inlet end accordingly requires, in view of achievable performance and thrust goals, a relatively large minimum overall diameter despite a comparatively small engine diameter to safely provide in its open position a relatively large mass flow in keeping with the requisite Mach numbers of the flow.

Such sliding valve concepts, again, provide an advantage in their comparatively great component strength while using only a small variety of parts and posing little risk of trouble for the entire shutoff system, especially to multiple-flap exit nozzle type concepts and the like. The risk of fragment ingestion and damage to the engine is here very low indeed.

Such sliding valve concepts can be employed, e.g.:

to shutoff or expose a "normal" turbojet engine, e.g., a straight-flow engine, at the air inlet end and/or the gas outlet end from or to the environment in an aerodynamically clean configuration; this conceivably involves an aircraft concept exhibiting separately arranged ramjet and turbojet engines, the latter to be shutoff and immobilized in straight ramjet operation;

to permit splitting, e.g., a mass flow (fan) optionally over an inner and/or outer engine flow path in the case of a double-flow or bypass turbojet of variable power distribution (changeover engine);

to shut off the respective basic turbine engine in the straight ramjet mode of a compound turbojet-ramjet engine from the ram-air flow at the air inlet end and the gas flow at the exit end, respectively; assuming, e.g., a ram-air duct of annular construction which envelopes the basic turbine engine and which at its front end has a common variable air inlet (ground start to hypersonic flight operation) for the basic engine and the ramjet portion of the engine; where downstream of the hot gas exit (nozzle) of the basic engine the ram-air duct can issue into a portion containing afterburning and additional burning (ramjet propulsion) features plus the adjoining variable exit nozzle. In connection with said last mentioned compound engine concept a variant might conceivably be used with a front fan which is immobilized in the ramjet mode and which in subsonic operation delivers into the ram-air duct which then serves as a bypass duct for the secondary flow.

In a broad aspect, an object of the present invention is to provide a suitable engine shutoff valve concept for said potential applications which in design and relative arrangement with the turbojet or basic turbine engine provides an aerodynamically clean (environment) slim overall engine at simultaneously clean configuration for optimum shutoff or opening at the air inlet end and/or the hot gas end.

This object is achieved according to the present invention by providing an arrangement, wherein the valve has vaulted surface sections which are spaced axially apart and circumferentially angularly offset by essentially 180° relative to the valve centerline and which form its maximum relative diameter.

By using three-dimensionally displaced drop- or mushroom-shaped configuration of the sliding valve in preferred embodiments it is possible to make a straight-flow turbojet engine, e.g., relatively slender or give it a relatively moderate diameter and to provide, in the open position of the valve when the mass flow through the engine is comparatively large (comparatively large thrust requirement), a correspondingly large air inlet flow area into the compressor to suit the specified flow criteria (Mach numbers, etc.). This applies similarly also to a compound gas turbine-ramjet engine, where for subsonic flight operation the basic turbine engine (inside) can be supplied with the requisite amount of intake air through, e.g., an outer annular ram-air duct at the inlet end, in which the relatively slender or small-diameter basic engine makes for an overall engine of relatively low frontal area drag. It is in especially the latter case that the relative increase in overall length of the shutoff valve caused by the invention plays no significant part, for the reason that there is sufficient installation space available for the purpose via the front-end variable air intake of the overall engine.

In oblique cylindrical sectional view of the circular cylindrical casing of the jet engine or basic turbine engine there results, e.g., a moderately uniformly elliptically contoured casing lip against which the shutoff valve with the mating contour of its elliptical circumferential or circular shutoff surface can be moved to shut off the engine at, e.g., the air intake end. It would also be readily feasible, however, to give the engine casing a moderately elliptical shape at least at the end terminating in the direction of the casing lip such that in oblique sectional view of the casing an annular lip with corresponding extreme edge is formed to which the oblique circumferential shutoff surface of the valve would have to be mated cylindrically.

The centerbody (stationary part of system) cooperating in connection with a shutoff valve and enclosing, e.g., an annular air inlet duct predominantly relative to engine casing surfaces, can be made axisymmetrically divergent in a downstream direction from a wall geometry which at first extends inwards asymmetrically with the engine centerline, to form an accelerating, uniform constriction of the duct carrying the airflow in the direction of the compressor inlet. In this manner the irregularities potentially caused in the airflow by the "asymmetry" of the valve can be homogenized over the overall circumference—before it enters the compressor.

Other objects, advantages and novel features of the present invention will become apparent from the following detailed description of the invention when considered in conjunction with the accompanying drawings.

DETAILED DESCRIPTION OF THE DRAWINGS

Figure 1:
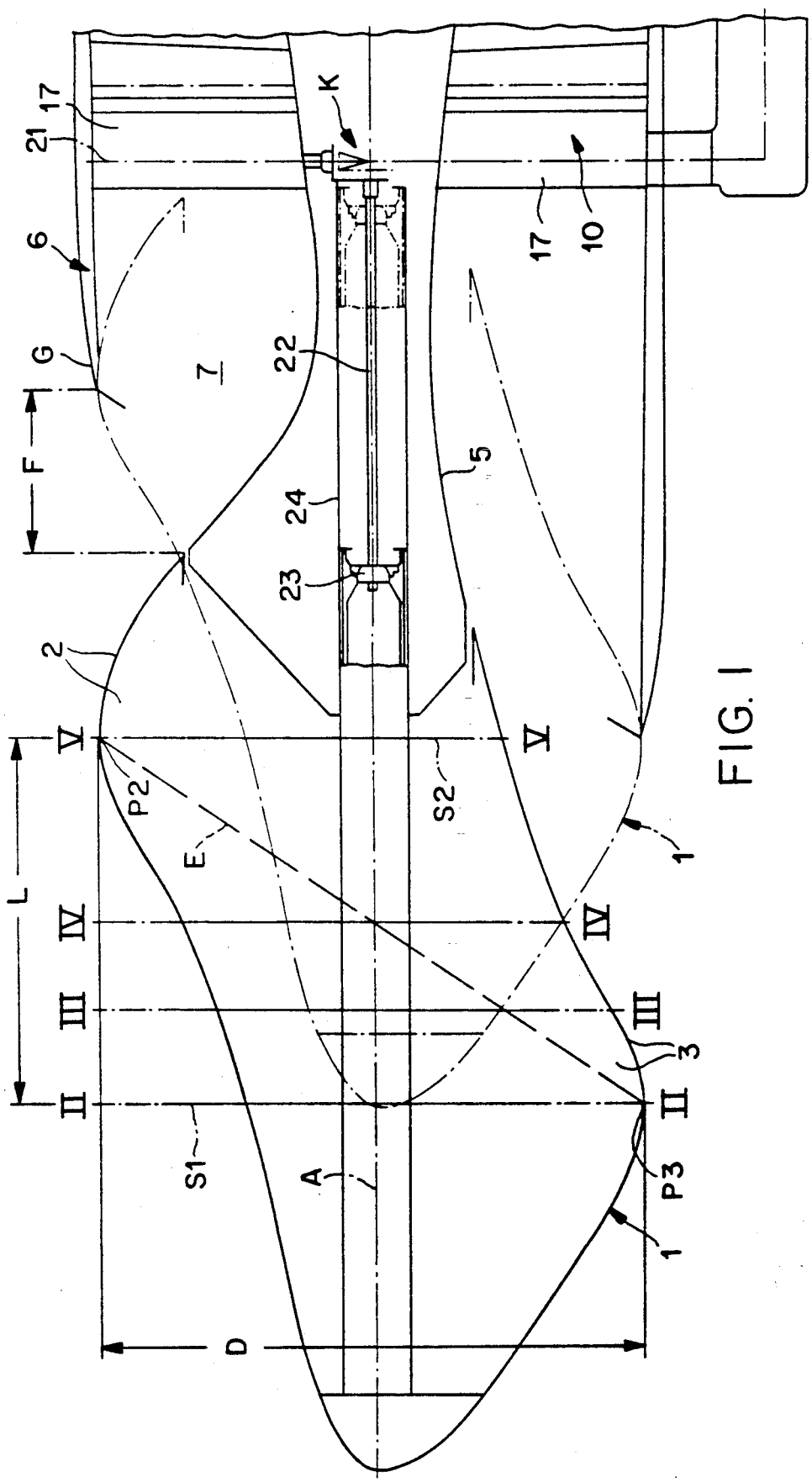
FIG. 1 is an elevation view illustrating the forward section of a straight-flow turbojet engine plus compressor inlet and a three-dimensionally displaced drop-shaped sliding valve in two different extreme positions with reference to a forward casing lip and in relative arrangement with a compressor air intake duct which is exposed in the one position of the valve, constructed in accordance with a preferred embodiment of the invention.
Figure 7:
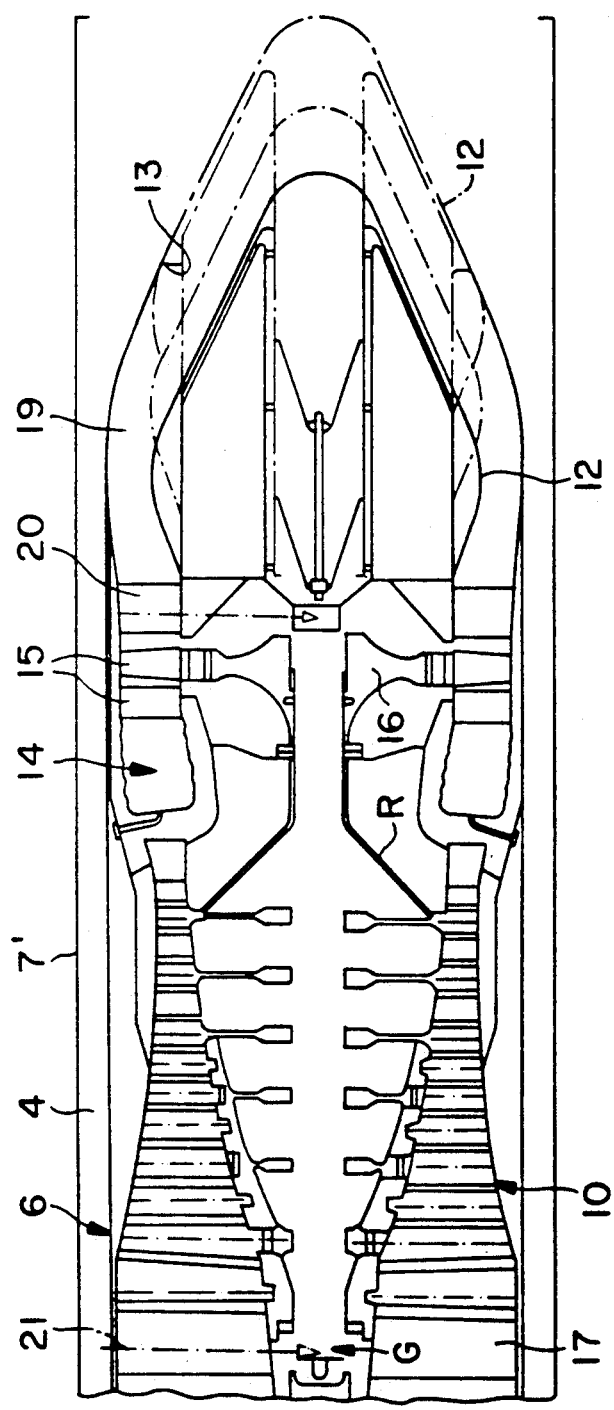
FIG. 7 is an elevation view in downscaled representation illustrating the essential remaining part of the engine, the forward section of which was shown in FIG. 6, with the compressor inlet again included, where the remaining engine part of FIG. 7 would also fit the forward section of FIG. 1, with the ram-air duct omitted.

With reference now to FIG. 1, a shutoff valve design is shown in conjunction with a turbojet engine in accordance with FIG. 7, reflecting the basic turbine engine underlying FIG. 7. This is a single-flow, single-shaft engine construction. In connection with FIG. 1, the intention is to optionally expose or shutoff this engine at the air intake end to or from the outer environment. In accordance with FIG. 1 and FIG. 7, then, the engine consists—viewed from left to right—of an axially movably arranged sliding valve 1, where the completely exposed inlet flow area F for the intake air into the engine is indicated by the solid-line representation of the valve 1, while the fully shutoff position of said inlet area F is indicated by the dash-dotted position of the valve 1. Still in accordance with FIG. 1, the valve 1 is associated with a stationary centerbody 5 which in the shown completely exposed position of the inlet area F—when viewed from the inner side of the engine—adjoins in predominantly non-rotationally symmetrical divergent configuration the respective aft end of the valve 1 in flush arrangement of the respective surfaces. The centerbody 5, together with a wall section of the engine shroud 6 terminating in a casing lip G, forms an annular air inlet duct 7. In the shutoff position of the inlet flow area F the valve 1 is partially retracted in said annular air inlet duct 7 as indicated by the dash-dotted circumferential contour.

The engine of FIGS. 1 and 7 further consists of a multi-stage axial-flow compressor 10, an annular combustion chamber 14 in coaxial arrangement with the engine centerline, and an axial-flow compressor drive turbine 15 which through its bladed disk 16 is connected to the drum-like rotor R of the axial-flow compressor 10 to form a single spool. At the hot-gas outlet end the axial-flow drive turbine 15 is followed by axially wetted struts 20 arranged within an annular hot gas duct 19. At the end of the annular hot gas duct 19 the engine shroud 6 terminates in a nozzle-like extreme edge 13 arranged coaxially with the engine centerline; where the engine is fitted at the exhaust gas outlet end with another mushroom-shaped shutoff valve 12.

In the extreme axially retracted position, here shown in solid line, of this shutoff valve 12 an annular nozzle exit section is formed between the nozzle-like extreme edge 13 on the one hand and the circumferential wall section of the shutoff valve 12, said wall section converging in the downstream direction. The broken-line contour of the shutoff valve 12 thus represents the fully shutoff position of the respective, formerly annular nozzle outlet area. In said shutoff position the engine would be shut off also in terms of hot gas from the outer surrounding air flow. In accordance with FIG. 1 and 7, also, the axial-flow compressor 10 of the engine is associated at the inlet end with several circumferentially equally spaced struts 17.

As it can be seen especially from FIG. 1, an externally driven shaft 21 can rotatably be carried through one of these hollow struts 17 to drive at the inner end an axially centrally supported ballscrew jack 22 via a bevel gearset K. Then when the ballscrew jack 22 is rotated a spherical nut 23 thereon, which is carried within a cylindrical stationary sleeve 24 of the centerbody 5 for axial movement, drives the valve 1 for axial adjustment through a connecting sleeve, which in a typical arrangement is fixedly connected to the valve 1 at the front end and to said spherical nut 23 at the other end.

In accordance with FIG. 1, then, the invention provides an axially movable sliding valve 1 which optionally closes off or exposes the engine at the air intake end by way of surface sections 2, 3, which are vaulted relative to the valve centerline A and mated to a stationary companion surface on an annular casing lip G. For this purpose, the valve 1 here exhibits surface sections 2, 3 which are spaced axially apart and are angularly offset circumferentially by essentially 180° with the valve centerline A and ar vaulted to form its respective largest relative diameter D. In other words, the vaulted surface sections 2, 3 form a sliding valve 1 of axially as well as circumferentially three-dimensionally displaced drop or mushroom shape. In vertical sectional planes, especially in sectional planes S1 and S2 associated with the vaulted surface sections 2, 3, the valve 1 exhibits a cross-sectional profile (see Section II—II and V—V, respectively, of FIG. 2 and FIG. 5) which is asymmetrical with reference to the valve centerline A, or polygonal in shape.

In accordance with FIG. 1, e.g., the valve 1 can form over the entire circumference a uniformly moderately elliptical shutoff surface profile following an inclined plane E which intersects the vaulted surface sections 2, at points P2 and P3, respectively, which are lying on the largest relative valve diameter D. Said sectional planes S1, S2, which intersect the three-dimensionally offset vaulted surface sections 2, 3 about centrally—viewed in an axial direction—should be arranged at a distance L, which simultaneously represents the maximum travel of valve 1 for shutting off or exposing the engine.

As it will also become apparent from FIG. 1, the valve 1 is extended axially to completely expose the respective air inlet section or the respective air inlet flow area F relative to the mating surface on the associated stationary casing lip G.

Figure 6:
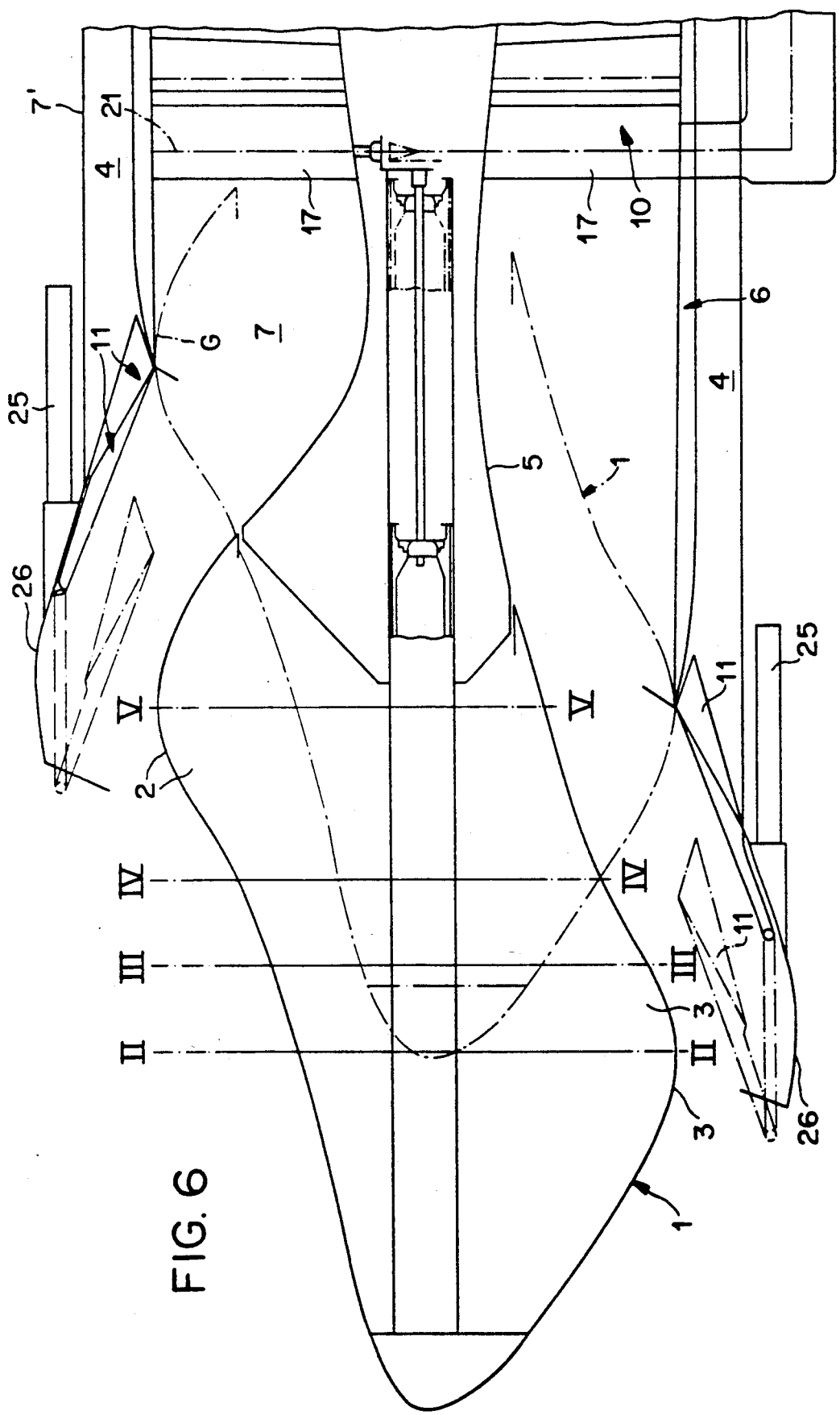
FIG. 6 is an elevation schematic view illustrating the forward section of the engine of FIG. 1, which is here shown, however, in combination with a ram-air duct enveloping the basic turbine engine (compound turbojet-ramjet engine), and also illustrating an additional sleeve valve for optionally exposing or shutting off the ram-air duct in two different extreme positions in relative arrangement with the two extreme positions of the shutoff valve.

The invention can be applied in an especially advantageous manner especially on a compound gas turbine-ramjet engine. The turbojet engine previously described in light of FIG. 1 could then operate as a basic turbine engine, where the inner turbojet engine, configured for subsonic and conceivably supersonic flight operation, would be the basic turbine engine that is enveloped by a predominantly annular ram-air duct 4 (FIG. 6) for hypersonic flight operation. In this configuration the ram-air duct 4 is formed between an outer circumferential wall 7' and the respective inner cylindrical engine shroud 6 of the basic turbine engine. The function of the intake-air shutoff or admission feature via valve 1 is in principle identical to that of FIG. 1, where unlike in FIG. 1 the objective in FIG. 6 is to optionally expose the annular ram-air duct 4 for the admission of ram air in the ramjet mode of operation and simultaneously shut off the basic turbine engine from the ram air supply. In the combined view of the gas turbine-ramjet engine of FIGS. 6 and 7, a sleeve valve 11 is provided which when the valve 1 is concurrently moved in the opposite direction and which shuts off the ram-air duct 4 when the intake air supply to the basic engine is admitted, or which exposes it to the ram-air supply when the basic engine is shut off. This sleeve valve 11 is expanded cone-fashion to suit the three-dimensionally displaced drop or mushroom shape of the valve 1, where the expansion occurs in an upstream direction such that when the ram-air duct 4 is shut off, the downstream valve end abuts on the face of the casing lip G.

In accordance with FIG. 6—with the basic turbine engine shut down and straight ramjet operation selected—the entire inlet flow area for ram air into the ram-air duct 4 forms an annular area, namely between the sleeve valve 11 and the drop-shaped valve 1 (surface sections 2 and 3) on the one hand and in sections, between rearward surface sections of the sleeve valve 11 and adjacent wall sections of a polygonal or rectangular forward extension 26 of the outer circumferential wall 7', on the other hand. Said sleeve valve 11 can be operated by several, e.g., four actuating members 25 equally spaced over the circumference of said extension 26. The actuating members 25 may optionally be pneumatically or hydraulically operated actuators with suitable push or pull rods movably carried axially through locally sealed sections of said extension 26.

In the solid-line extreme position indicated in FIG. 6, the sleeve shutoff valve 11 blocks the ram-air duct 4 while the intake air supply is admitted into the basic turbine engine, where the inclined surface contour of the sleeve valve 11 is selected such that in this extreme position and in conjunction with said local sections of the three-dimensional extension 26, it forms an upstream continuation of the annular air intake duct 7. In connection with FIGS. 6 and 7 the hot gas shutoff valve 12 previously described and discussed with reference to FIGS. 1 and 7 operates to optionally expose or shutoff the engine from or to the ram air from said duct 4.

The shutoff means covered in FIGS. 1 and 6 by way of valve 1 would analogously be suitable also for optionally shutting off or exposing a single-flow engine or the basic engine or a compound turbojet-ramjet engine from or to the hot gas flow.

Figure 2:
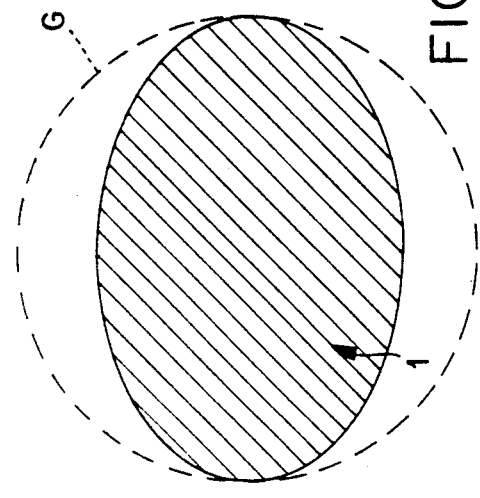
FIG. 2 is a sectional view of the valve taken at line II—II of FIG. 1.
Figure 3:
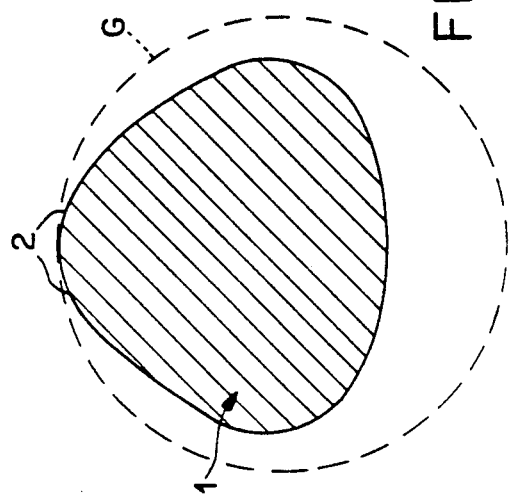
FIG. 3 is a sectional view of the valve taken at line III—II of FIG. 1.
Figure 4:
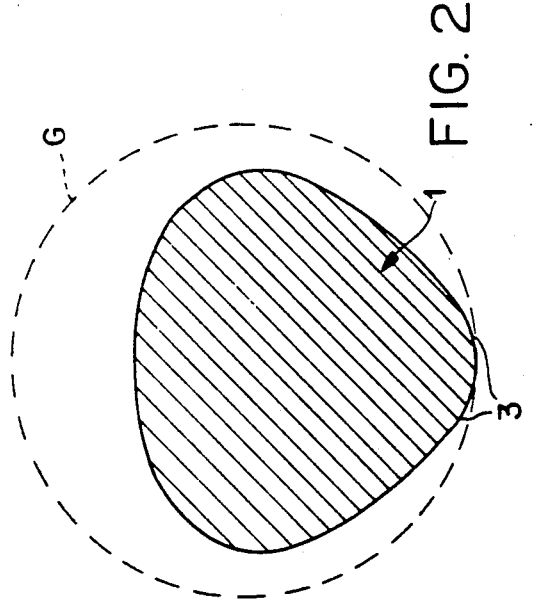
FIG. 4 is a sectional view of the valve taken at line IV—IV of FIG. 1.
Figure 5:
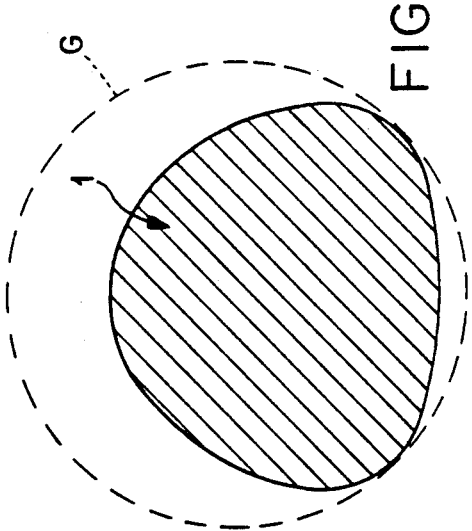
FIG. 5 is a sectional view of the valve taken at line V—C of FIG. 1.

Asymmetrical or polygonal cross-sectional profiles of the shutoff valve of FIG. 1 or 6 are represented by the respective sectional views superposed on FIGS. 2, 3, and 5. In accordance with section IV—IV of FIG. 1 or 6, FIG. 4 shows a symmetrically elliptical cross-sectional profile of the shutoff valve 1. The broken-line circular cylindrical contour shown in FIGS. 2, 3, 4 and 5 represents the face or frontal view of the engine with respect to the casing lip G.

In the compound gas turbine-ramjet engine design of FIGS. 6 and 7 the aft end of the outer circumferential wall 7' shown in FIG. 7 can be directly followed by a jet pipe extending coaxially with the engine centerline, in which jet pipe reheating and additional heating means are arranged, where the downstream end of this jet pipe with one or more combustion means in it can in turn communicate with a variable exit nozzle designed to accommodate the respective mass flows and throat areas to be used in the range from ground start to flight operation in the outer atmosphere (hypersonic flight operation).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An axially movable valve for optionally shutting off and exposing an airflow opening in a turbojet engine, said valve including surface sections which are vaulted with respect to a valve centerline and are adapted to correspond with a stationary companion surface on an annular engine casing lip, wherein the valve has a plurality of vaulted surface sections which are spaced axially from one another and circumferentially angularly offset from one another relative to the valve centerline.

2. A valve according to claim 1, wherein the valve has cross-sectional profiles in planes perpendicular to the valve centerline at the vaulted surface sections which are asymmetrical with reference to the valve centerline.

3. A valve according to claim 1, wherein the vaulted surface sections form a valve having a divergent/convergent shape.

4. A valve according to claim 3, wherein the valve has cross-sectional profiles in planes perpendicular to the valve centerline at the vaulted surface sections which are asymmetrical with reference to the valve centerline.

5. A valve according to claim 4, wherein two of said vaulted surfaces are provided which are spaced circumferentially by essentially 180° relative to the valve centerline.

6. A turbojet engine having at least one axially movably arranged sliding valve to optionally shutoff or expose the engine via surface sections which are vaulted with respect to the valve centerline and cooperate with a stationary companion surface on an annular casing lip, wherein the vaulted surface sections form a divergent/convergent shaped sliding valve, said vaulted surface sections being spaced axially apart relative to the valve centerline and being angularly offset circumferentially by essentially 180° relative to the valve centerline, said vaulted surface sections forming a maximum valve diameter D,
further wherein the sliding valve forms a shutoff surface profile which is uniformly elliptical over the entire circumference and which follows an inclined plane intersecting the vaulted surface sections at points lying on the maximum valve diameter D, said shutoff surface profile mating with an oblique cylinder section forming the stationary companion surface.

7. Engine of claim 6, wherein said engine is designed as a compound gas turbine-ramjet engine, wherein an inner turbojet engine is designed for subsonic flight operation as a basic engine which is enveloped by a predominantly annular ramjet duct for hypersonic flight operation, and wherein at least one such valve is provided, which when the ramjet propulsion mode is selected, shuts off the air inlet area of the basic engine from the ram-air flow.

8. Engine of claim 2, wherein the valve and the centerbody form constituent parts of the air intake of the compressor of the basic engine.

9. Engine of claim 7, wherein a sleeve valve is provided which when the valve is moved, concurrently moves in an opposite direction to optionally expose or shut off the ramjet duct to or from the incoming air stream, and which is conically expanded and arranged obliquely to the engine centerline to suit the three-dimensionally displaced divergent/convergent shape of the valve such that that when the ramjet duct is shut off it frontally abuts on the casing lip with its downstream end.

10. Engine of claim 7, wherein the valve is associated with a stationary centerbody which in the fully exposed position of the inlet area adjoins the aft valve and, starting from the inner side of the engine in predominantly non-rotationally symmetrical divergent arrangement and which together with a wall section of the engine casing terminating towards the casing lip, forms an annular air inlet duct which can be ridges by the valve to shut off the inlet area.

11. Engine of claim 10, wherein the valve and the centerbody form constituent parts of the air intake of the compressor of the basic engine.

12. Engine of claim 11, wherein a sleeve valve is provided which when the valve is moved, concurrently moves in an opposite direction to optionally expose or shut off the ramjet duct to or from the incoming air stream, and which is conically expanded and arranged obliquely to the engine centerline to suit the three-dimensionally displaced divergent/convergent shape of the valve such that that when the ramjet duct is shut off it frontally abuts on the casing lip with its downstream end.

13. Engine of claim 6, wherein the valve has cross-sectional profiles in planes perpendicular to the valve centerline at the vaulted surface sections which are asymmetrical with reference to the valve centerline.

14. Engine of claim 13, wherein the sectional planes intersecting the three-dimensionally displaced vaulted surface sections are axially spaced apart from one another at a certain distance which equals the maximum travel of the valve for shutting off or exposing the engine.

15. Engine of claim 14, wherein the valve is designed and arranged for optionally exposing or shutting off an air inlet area into the engine and wherein the valve is axially extended relative to the companion surface on the associated stationary casing lip for exposing the respective air inlet area.

16. Engine of claim 6, wherein the valve is associated with a stationary centerbody which in the fully exposed position of the inlet area adjoins the aft valve and, starting from the inner side of the engine is predominantly non-rotationally symmetrical divergent arrangement and which, together with a wall section of the engine casing terminating towards the casing lip, forms an annular air inlet duct which can be bridged by the valve to shut off the inlet area.

17. Engine of claim 16, wherein the centerbody has when viewed downstream, an asymmetrically convergent, rotationally symmetrically divergent contour.

18. Engine of claim 6, wherein the valve is designed and arranged for optionally exposing or shutting off an air inlet area into the engine and wherein the valve is axially extended relative to the companion surface on the associated stationary casing lip for exposing the respective air inlet area.

19. A turbojet engine having at least one axially movably arranged sliding valve to optionally shutoff or expose the engine via surface sections which are vaulted with respect to the valve centerline and cooperate with a stationary companion surface on an annular casing lip, wherein the vaulted surface sections form a divergent/convergent shaped sliding valve, said vaulted surface sections being spaced axially apart relative to the valve centerline and being angularly offset circumferentially by essentially 180° relative to the valve centerline, said vaulted surface sections forming a maximum valve diameter D,
further wherein the sliding valve forms a shutoff surface profile which is uniformly circular over the entire circumference and which follows an inclined plane intersecting the vaulted surface sections at points lying on the maximum valve diameter D, said shutoff surface profile mating with an oblique cylinder section forming the stationary companion surface.

* * * * *